127,992

UNITED STATES PATENT OFFICE.

HIRAM F. SNOW AND JAMES H. DAVIS, OF DOVER, NEW HAMPSHIRE.

IMPROVEMENT IN COMPOSITIONS FOR PAVEMENTS.

Specification forming part of Letters Patent No. 127,992, dated June 18, 1872.

*To all persons to whom these presents may come:*

Be it known that we, HIRAM F. SNOW and JAMES H. DAVIS, both of Dover, of the county of Strafford and State of New Hampshire, have invented a new or Improved Composition for Pavements; and do hereby declare the same to be described as follows:

In making the said composition we employ, in or about in the proportions named, twenty bushels of sand (such as generally used with lime for plastering) well mixed with seven bushels of fine or sifted coal-ashes. We also take forty gallons of coal-tar, ten pounds of asphaltum, or fifteen pounds of roofing-pitch, or fifteen pounds of resin, and boil such together until well incorporated. Next remove the mixture from the boiler or out of the reach of the fire, and add to it from one to four quarts of sulphuric acid, and stir quickly the whole until it may foam. The mixture of sand and coal-ashes is next to be made into a pile, hollowed out on top like a saucer, after which there should be poured into the hollow about two gallons of the hot mixture above mentioned, with the addition of from one-half a gill to a gill of sulphuric acid, well stirred in until foaming of the mixture is produced. A portion—say about one-twentieth part of the sand and ashes—should next be worked into the mixture, and the same is to be repeated until the whole of the mass of sand and ashes shall have been duly intermixed with the tarry composition. The composition will now be ready for use in manner as hereinafter explained.

We have discovered that by mixing with the said composition a quantity of hydraulic cement, such as sets when mixed with water and sand, water will be prevented from permeating the concrete or composition when exposed to the weather, and that such water is the great cause of common concrete pavements crumbling, as it freezes in winter and causes disintegration of the mass. The sand to be used should be sharp and coarse.

For common walks or cellar topping or floors, the ground should be first rolled or condensed to the shape required, and well covered with a bottoming of some material, (such as broken stone, or furnace-slag or cinder, for instance,) such as will pack together well when rolled by a heavy roller, for a good concrete pavement or flooring cannot be formed when the foundation is loose. The bottoming should be completed to receive about two inches of the topping when rolled and finished. Next, there should be spread evenly upon the bottoming a mass of the concrete topping or composition above mentioned, to a depth, say, of about three inches, strips of wood, if desirable, being used in the ordinary way as guides. Next, with a light roller the composition is to be rolled down, it at the time or just before being sprinkled or covered with a coating of dry hydraulic lime or hydraulic cement, which will not only extract more or less of moisture from the composition, but improve the color of the walk or topping and be otherwise beneficial. For the hydraulic cement we have found a mixture of sand, gypsum, and plaster of Paris in equal quantities will answer, although by no means so well.

In making roads, or drive-ways, or street-pavements for heavy teams or vehicles to run upon, there should first be laid a compact foundation of stone or gravel, which should be covered with the concrete to a depth of from three to six inches. Next, there should be spread upon the layer of concrete or stratum of gravel broken stone, cobble-stone, or other suitable mineral substitute, which, in turn, should be covered with a layer of from one to four inches thickness of the concrete made by boiling the tar, so that when set it will be very hard, and adding the sand and ashes in a hot state, and increasing the quantity of sulphuric acid. The upper layer of concrete should be thoroughly compacted or rolled by a heavy roller weighing at least eight hundred pounds per foot in length. The lower stratum of concrete, being somewhat elastic, operates as a cushion to relieve the strata over it from injury incident to percussion of the wheels, or prevents it from crumbling, or has effects analogous to those of a wooden sleeper supporting the iron rail of a railway.

A road so constructed has been found to be very desirable, or to resist wear to advantage, and not to rut or be noisy, comparatively speaking, when in use.

We make no claim to water, lime, or hydraulic cement used in mixture with coal-tar or pitch, dry clay, gravel, or sand, as we use the water-lime or cement in a dry state, not mixed with the said materials or any thereof, but spread on the surface, as hereinbefore described. Nor do we claim any pavement or composition as described in either of the United States Patents Nos. 88,139, 94,785, 96,984, 97,149, and 115,887.

We do not herein claim the use alone of either coal-tar, sand, or sulphuric acid in making a pavement composition; but What we do claim is—

1. Our new or improved mode or process of making the above-specified composition or concrete, made of coal-tar, asphaltum, (or either of its substitutes, as set forth,) sand, coal-ashes, and sulphuric acid, combined in manner and in or about in the proportions substantially as stated.

2. We also claim, in making a concrete pavement with a bottoming covered by a layer of the concrete, as hereinbefore described, the employment, in manner as set forth, of a coating of dry hydraulic lime or cement, for the purpose as explained.

3. We also claim the employment of a bottoming of concrete, as described, with a covering layer of stone or gravel and a capping layer of such concrete, or with such and a foundation of cobble-stone, as set forth.

HIRAM F. SNOW.
JAMES H. DAVIS.

Witnesses:
W. T. PERKINS,
C. S. PERKINS.